(12) United States Patent
Delfer et al.

(10) Patent No.: US 10,543,513 B1
(45) Date of Patent: Jan. 28, 2020

(54) COMMINGLING OPTIMIZATION OF MAIL (71) Applicant: Broadridge Output Solutions, Inc., Jersey City, NJ (US)

(72) Inventors: Frank Delfer, Incline Village, NV (US); John Arndt, El Dorado Hills, CA (US); Kevin T. Malone, Folsom, CA (US)

(73) Assignee: Broadridge Output Solutions, Inc., Jersey City, NJ (US)

( * ) Notice: Subject to any disclaimer, the term of this patent is extended or adjusted under 35 U.S.C. 154(b) by 1143 days.

(21) Appl. No.: 14/449,735

(22) Filed: Aug. 1, 2014

Related U.S. Application Data (60) Provisional application No. 61/861,749, filed on Aug. 2, 2013.

(51) Int. Cl.
*G06Q 10/06* (2012.01)
*B07C 3/00* (2006.01)

(52) U.S. Cl.
CPC ......... *B07C 3/00* (2013.01); *G06Q 10/06313* (2013.01); *G06Q 10/06316* (2013.01)

(58) Field of Classification Search
CPC .................. G06Q 10/06313; G06Q 10/06316
USPC ......................................................... 705/7.23
See application file for complete search history.

(56) References Cited

U.S. PATENT DOCUMENTS

| | | | | |
|---|---|---|---|---|
| 5,377,120 A * | 12/1994 | Humes | ................... | G06Q 99/00 270/58.01 |
| 6,697,843 B1 * | 2/2004 | Carlin | ................... | G06Q 10/08 705/406 |
| 7,522,971 B2 * | 4/2009 | Brehm | ................... | B07C 3/00 209/900 |
| 2002/0053533 A1 * | 5/2002 | Brehm | ................... | B07C 3/00 209/3.1 |
| 2003/0200113 A1 * | 10/2003 | Latta | ................... | B07C 3/00 705/401 |
| 2005/0165704 A1 * | 7/2005 | Lopez | ................... | G07B 17/00467 705/410 |
| 2008/0012210 A1 * | 1/2008 | Gates | ................... | B65H 45/144 271/185 |
| 2012/0066060 A1 * | 3/2012 | Wilen | ................... | G06Q 30/0241 705/14.49 |
| 2012/0274020 A1 * | 11/2012 | Daboub | ................... | B07C 3/02 271/303 |

OTHER PUBLICATIONS

Boone, Ken. Save time and postage with commingling. American Printer 226.2: 60-61. Prism Business Media Inc. (Nov. 2000) Abstract.*

* cited by examiner

*Primary Examiner* — Timothy Padot
(74) *Attorney, Agent, or Firm* — Greenberg Traurig, LLP (57) ABSTRACT

A processing system and method for nationwide commingling of mail items to increase efficiency and lower mailing costs includes a pre-sort facility which creates a first set of diverted mail items and a first set of associated data while a print and mail manufacture facility generates a second set of manufactured mail items and a second set of associated data and then receives the first set of diverted mail items and first set of associated data from the pre-sort facility and then commingles the first and second sets of mail items according to a predetermined set of commingling rules applied to the first and second sets of associated data to produce commingled mail items which reduces postal costs in mailing the commingled mail item.

3 Claims, 7 Drawing Sheets

COMMINGLING OPTIMIZATION OF MAIL

CROSS-REFERENCE TO RELATED APPLICATIONS

This application claims priority to, and the benefit of, U.S. provisional patent application Ser. No. 61/861,749 filed on Aug. 2, 2013, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The subject invention pertains generally to commingling optimization of third party mail items. More particularly, the subject invention related to nationwide commingling optimization of third party mail items utilizing a mailing pack that contains a plurality of mail items that are being sent to a single mailing address. The subject method and system present a solution for optimizing the throughput of the postal system to reduce the cost per unit delivered. Optimization is accomplished by establishing a nationwide commingling infrastructure which reduces the fragmentation of traditional mail commingling, thereby introducing new efficiencies for the subject invention.

2. Description of Related Art

The subject invention references and patentably improves the methods and systems described in "System and Method for Combining Individual Statements into a Single Mailing Envelope" (U.S. Pat. No. 5,774,885 to Delfer) and "Postal Processing System" (U.S. Pat. No. 5,264,665 to Delfer). The former outlines an approach to combining multiple discrete mail items into a single mailing package for postal handling. The latter describes an approach to using postal weight and thickness rules to maximize the content of a mailing envelope and mailing tray.

BRIEF SUMMARY OF THE INVENTION

An object of the present invention is to provide a system and method for to optimizing the throughput of the postal system by creating a commingling infrastructure that allows cooperation among large mailers and presort facilities Another object of the present invention is to furnish a nationwide commingling system and process for mail that is accomplished by creating knowledge based data interchanges between print and mail manufacturers and the postal presort facilities.

A further object of the present invention is to supply a nationwide commingling is accomplished by creating knowledge based data interchanges between print and mail manufacturers and the postal presort facilities in which these interchanges facilitate the routing of physical mail pieces to create more efficient commingling results. In addition to improving commingling results, the mail stream may be further consolidated into a single mailing envelope (a statement pack) creating additional efficiencies and cost reductions.

Still another object of the present invention is to disclose a nationwide commingling is accomplished by creating knowledge based data interchanges between print and mail manufacturers and the postal presort facilities in which these interchanges facilitate the routing of physical mail pieces to create more efficient commingling results and the mail stream may be further consolidated into a single mailing envelope creating additional efficiencies and cost reductions.

Disclosed is a mail item processing system for nationwide commingling of mail items to increase efficiency and lower mailing costs. Comprising the subject invention are: 1) a plurality of pre-sort facilities, wherein each pre-sort facility creates a first set of diverted mail items and a first set of associated data; 2) a print and mail manufacture facility that generates a second set of manufactured mail items and a second set of associated data and receives the first set of diverted mail items and first set of associated data from each of the pre-sort facilities; and 3) means for commingling the first and second sets of mail items according to a predetermined set of commingling rules applied to the first and second sets of associated data to produce commingled mail items which reduces postal costs in mailing the commingled mail items. Additionally, the subject invention comprises means for assembling a plurality of mail items going to one address within a single envelope.

Further disclosed is method for the nationwide commingling of mail items to increase efficiency and lower mailing costs that comprises the steps of: 1) diverting a first set of mail items at a plurality of pre-sort facilities that creates a first set of mail items and a first set of associated data; 2) generating a second set of manufactured mail items and a second set of associated data at a print and mail manufacture facility; 3) receiving the first set of mail items and the first set of associated data from the pre-sort facilities; and 4) commingling the first set of diverted mail items with the second set of manufactured mail items according to a predetermined set of commingling rules applied to the first and second sets of associated data to produce reduced postal mailing costs in mailing the commingled mail items. Further comprising the subject invention is the step of assembling a plurality of mail items going to one address within a single envelope.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Figure 1A:
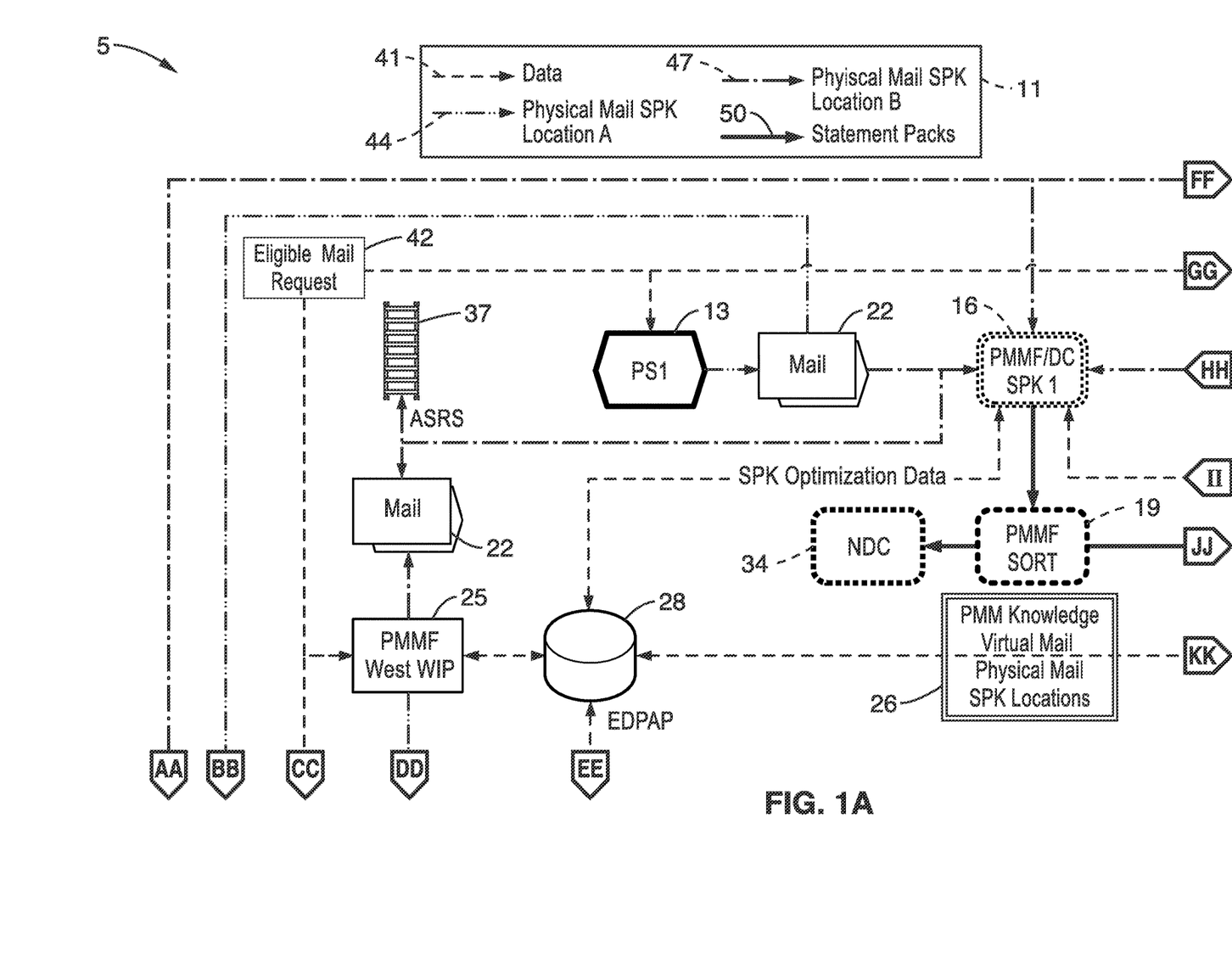
FIG. 1A shows the upper left quadrant of the complete flow diagram of the subject method and system in which various possible mail processing configurations interrelate to create the large-scale, usually nationwide, commingling of mailable items from third party commingling operations which utilize a common mailing envelope mailed to a single address.
Figure 1B:
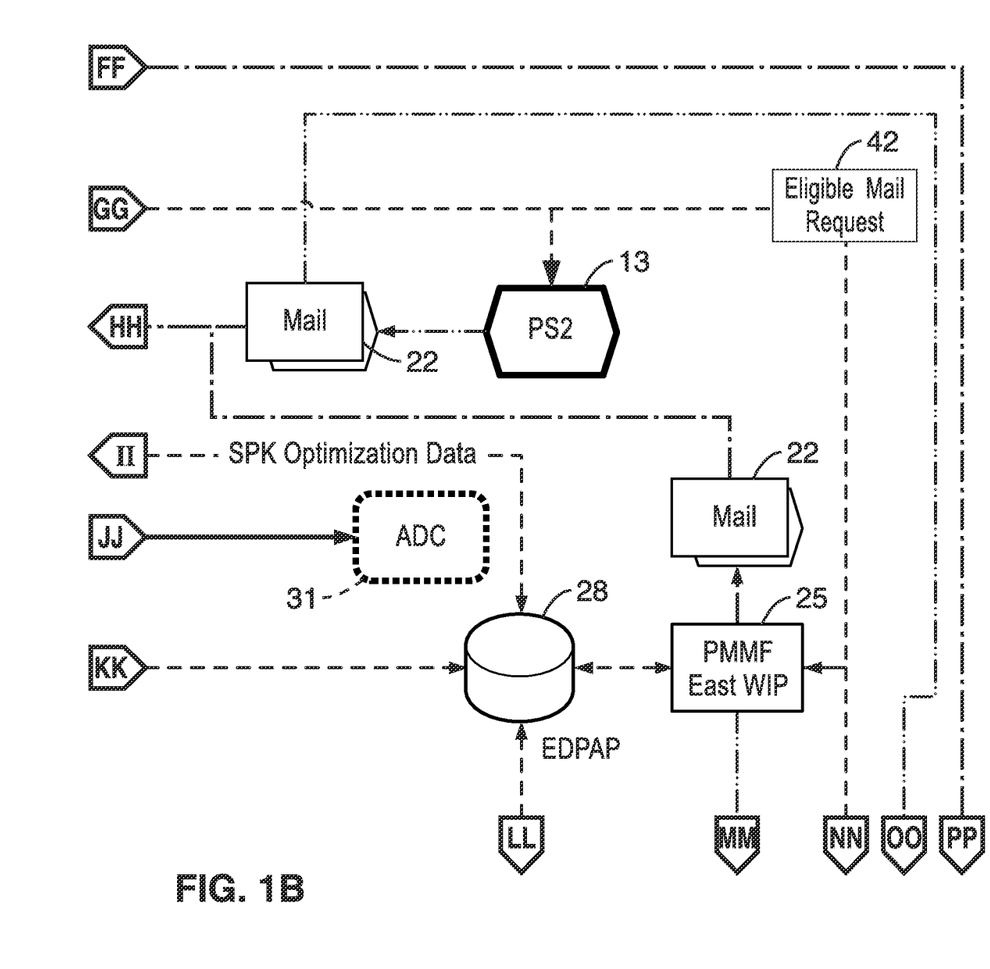
FIG. 1B shows the upper right quadrant of the complete flow diagram described for FIG. 1A above.
Figure 1C:
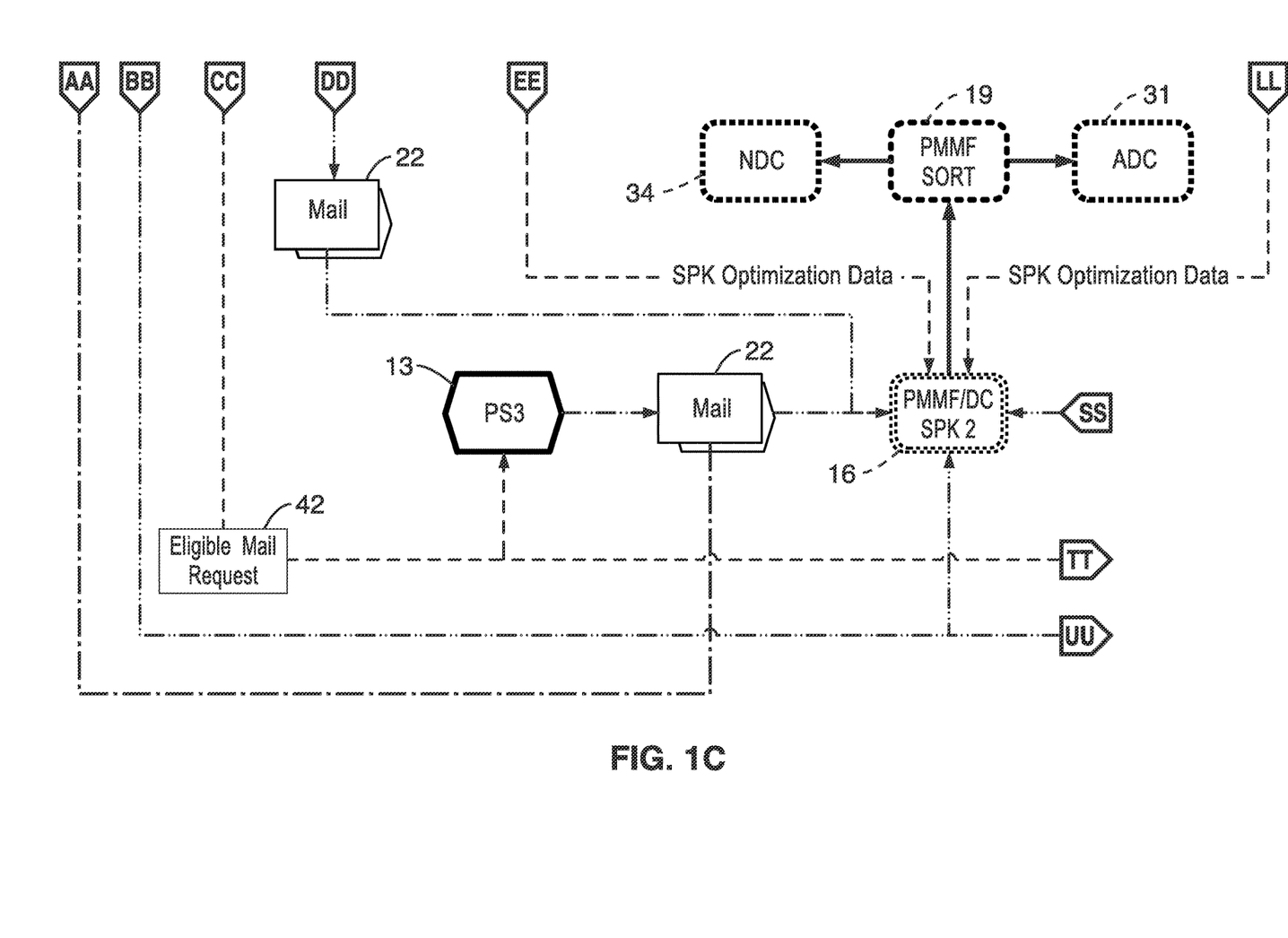
FIG. 1C shows the lower left quadrant of the complete flow diagram described for FIG. 1A above.
Figure 1D:
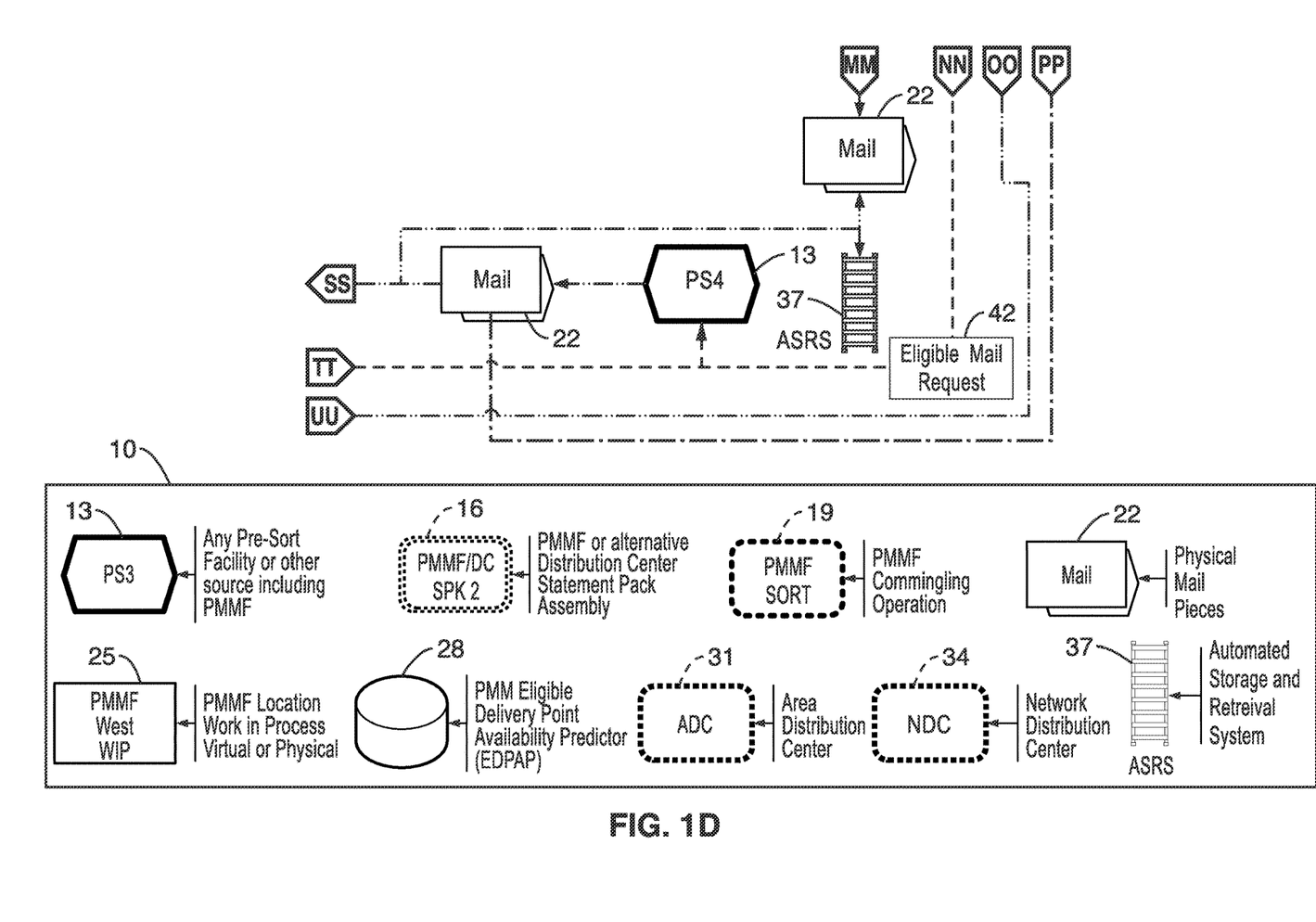
FIG. 1D shows the lower right quadrant of the complete flow diagram described for FIG. 1A above.
Figure 2A:
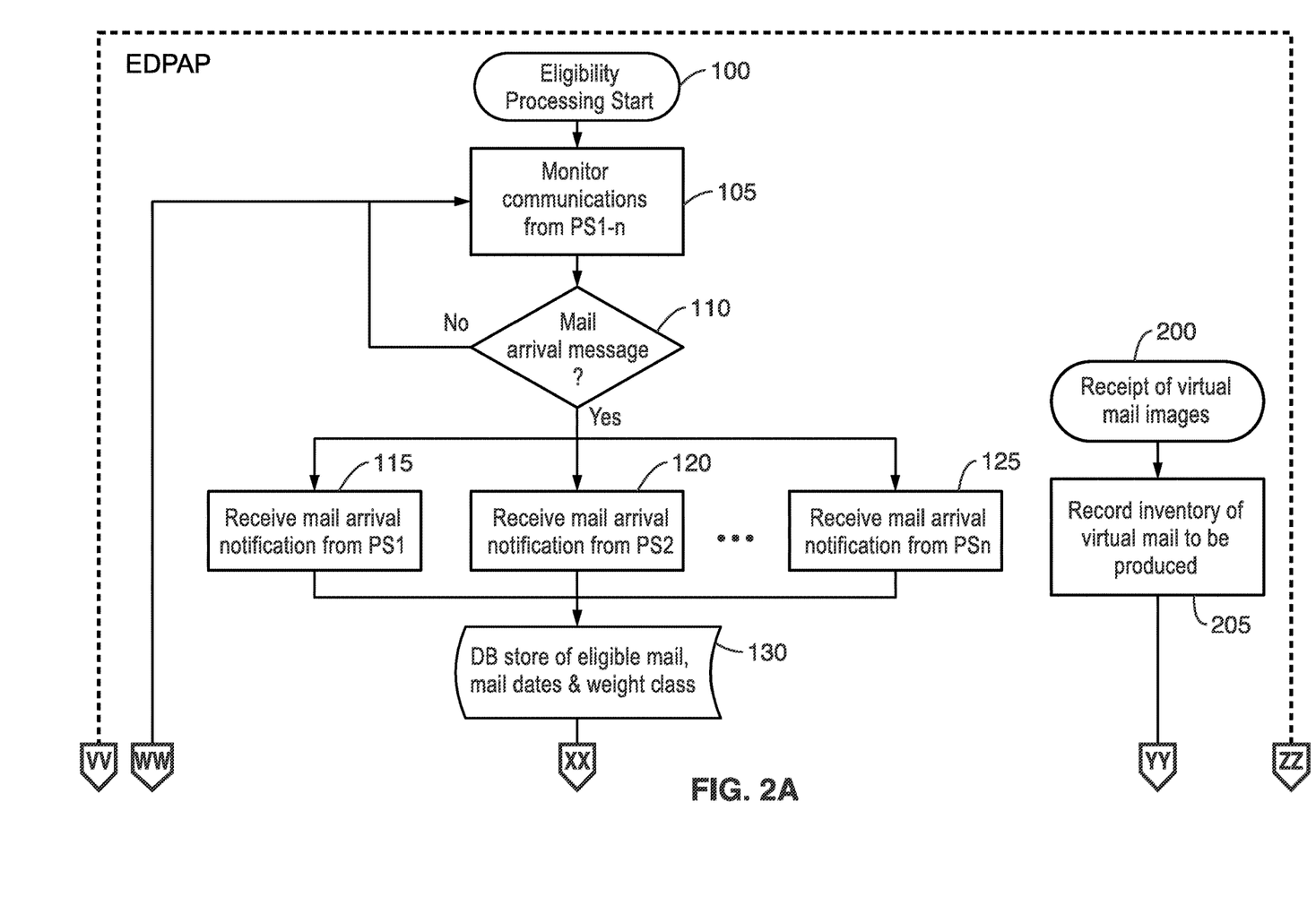
FIG. 2A shows a top half of a flow diagram for the Eligible Delivery Point Availability Predictor (EDPAP) for the subject invention.
Figure 2B:
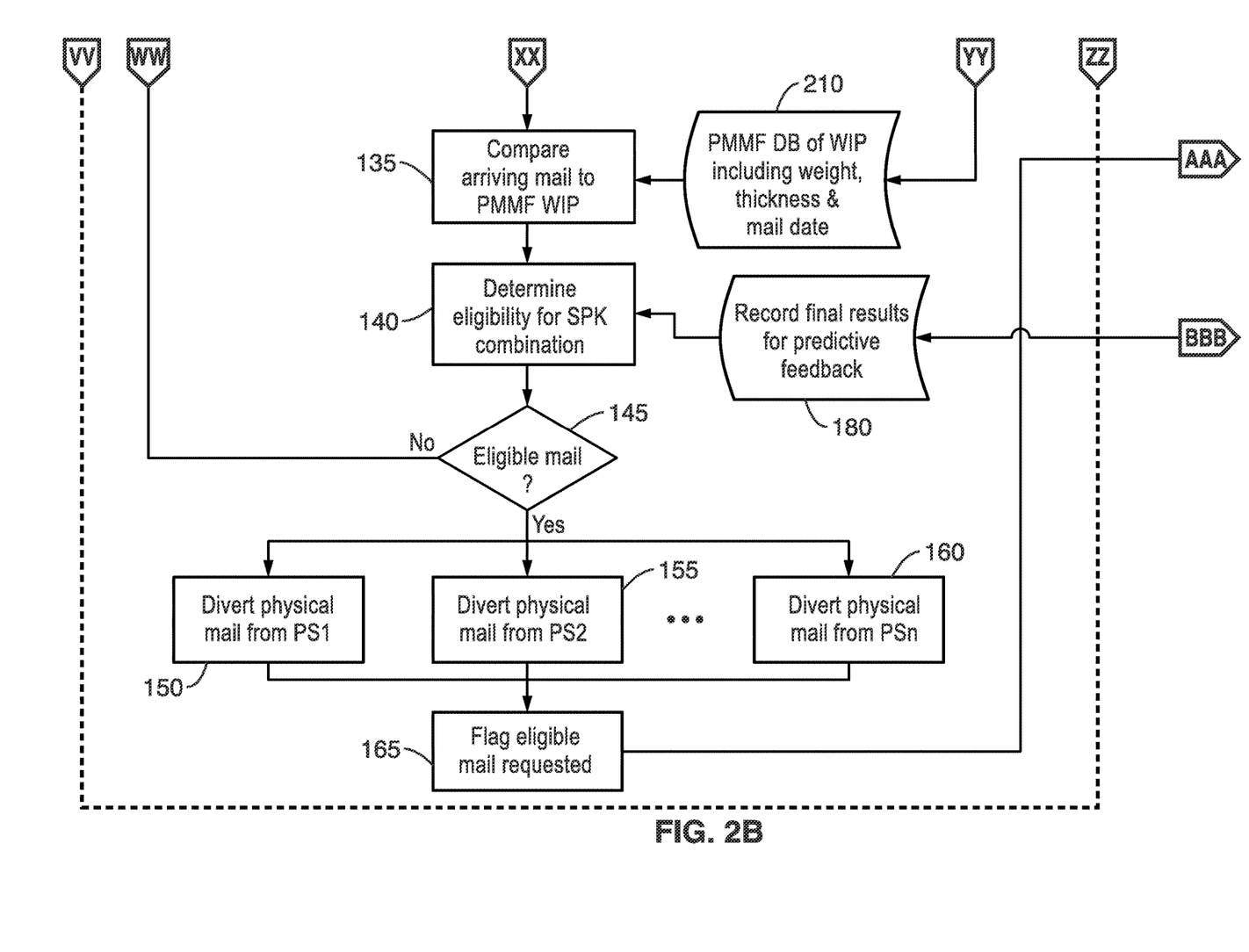
FIG. 2B shows a bottom half of the flow diagram for the (EDPAP for the subject invention.
Figure 2C:
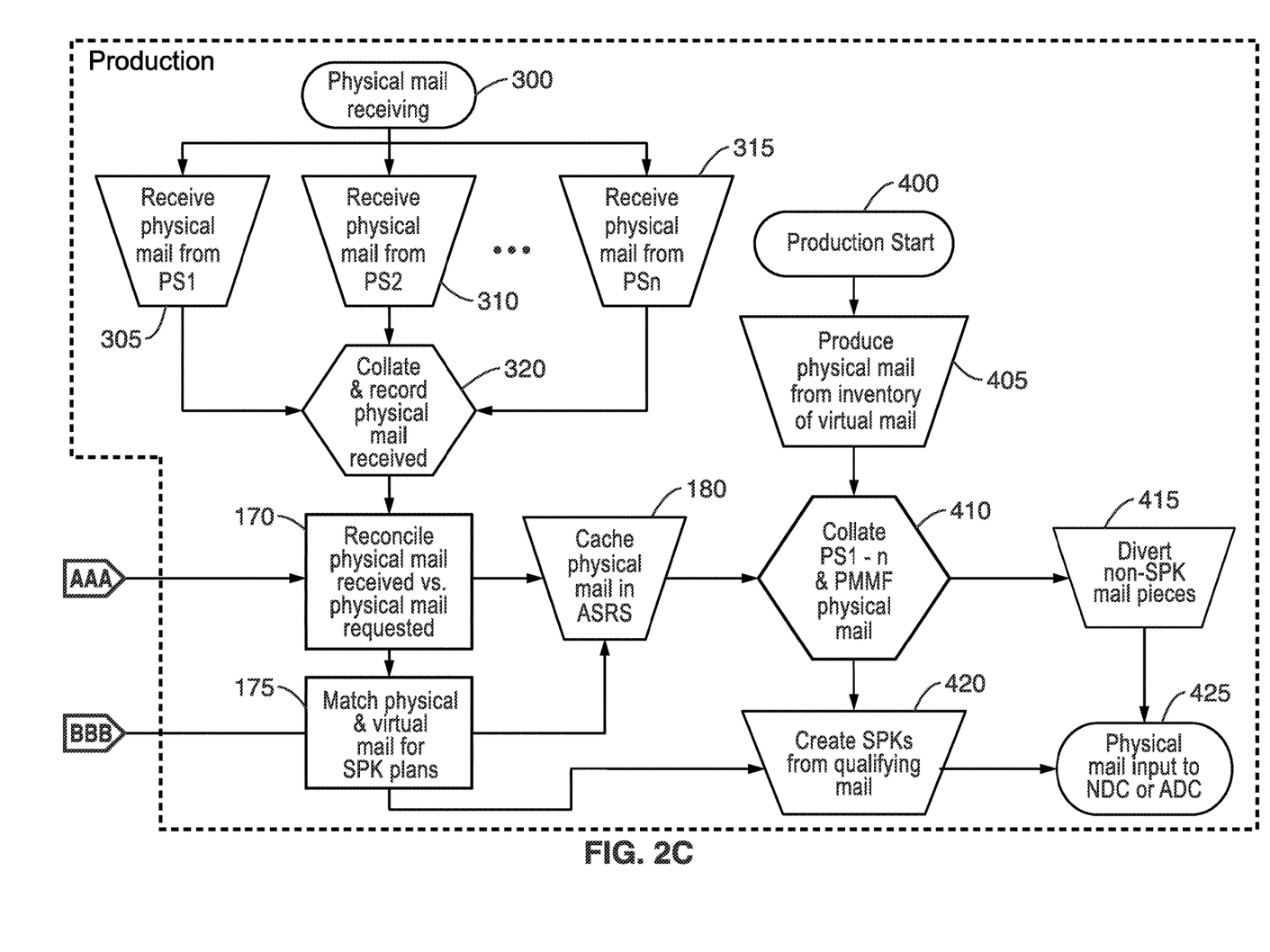
FIG. 2C shows a flow diagram for the incorporation of the production side of the subject system with the EDPAP internal processing.

Referring more specifically to the drawings, for illustrative purposes the present invention is embodied in the system and method generally shown in FIGS. 1 and 2. It will be appreciated that the system may vary as to configuration and as to details of the components, and that the method may vary as to the specific steps and sequence, without departing from the basic concepts as disclosed herein.

The subject invention is created to optimize the throughput of the postal system by creating a commingling infrastructure that allows cooperation among large mailers and presort facilities (PS1, PS2, PS3, PS4 . . . PSn). Nationwide commingling is accomplished by creating knowledge based data interchanges between print and mail manufacturers (PMM) and the postal presort facilities. These interchanges facilitate the routing of physical mail pieces to create more efficient commingling results. In addition to improving commingling results, the mail stream may be further consolidated into a single mailing envelope (a statement pack) creating additional efficiencies and cost reductions.

FIGS. 1A, 1B, 1C, and 1D depict an embodiment of the subject invention, although other variations are considered to be within the realm of this disclosure. The various components of the subject invention are described immediately below and depicted in FIG. 1A-1D (which will be described in detail with associated reference numbers further below).

In summary, the subject invention comprises a method and system in which: 1) Mail piece Print Data is transmitted to a Print and Mail Manufacturing Facility (PMMF). Mail pieces are either printed and mailed, printed and stored in an Automated Storage and Retrieval System (ASRS) for later use, or not printed and are virtually stored until ready for the subject Nationwide Commingling process; 2) Accessing information on exactly what virtual and physical mail pieces and their associated delivery points are stored in the eligibility database; 3) Presort Operations include $3^{rd}$ party and Print and Mail Manufacturer (PMM) look up eligibility of individual mail pieces they are processing in the Eligible Delivery Point Availability Predictor (EDPAP) database. The eligible mail pieces are separated and routinely sent to the PMMF (Print and Mail Manufacturing Facility)/DC (Distribution Center) one address, single mailing envelope (StatementPack®) production facility, most often on a daily basis; 4) Eligible mail pieces from the Third Party Presort Operation and mail pieces produced by the PMMF are sorted together in a commingling process and may be placed in one address (one delivery point), single mailing envelopes (StatementPacks®); and 5) The created one address, single mailing envelopes (StatementPacks®) can then either be further sorted to increase postal density, or sent directly to a USPS facility depending on zip code rate class.

By way of further explanation, various critical elements of the subject invention are now discussed.

Print & Mail Manufacturing Facilities (PMMFs)—

The core of the subject nationwide commingling system resides with a print and mail manufacturer (PMM) and their associated facilities (PMMF). This manufacturer may have more than one facility, PMMF, within the United States (for example: West Coast and East Coast, etc.). The PMM receives electronic images of mail from its customers to be produced into physical mail for mailing within the postal system. This electronic information allows the PMM to have processing insights into the contents of the physical mail stream at a future date. This provides a distinct advantage for the PMM. The PMM can profile the mail stream in the future for specific mailing dates (necessitated by various contract requirements and other mandated deadlines) and request physical mail from presort facilities, PFs, to be combined with the manufacturer's physical mail. The manufacturer may also transfer the responsibility of producing some in-house mail to another of its facilities in the United States (or other geographical region) based on geographic requirements.

Eligible Delivery Point Availability Predictor (EDPAP)—

The PMM maintains a computerized system with suitable programming that accumulates information on PMMF future production and in-house physical mail pieces as well as the presort facilities mail pieces. This information is used by the PMM to request physical mail be forwarded to the PMMF from the presort facilities for commingling with the PMMF mail stream.

Information on the presort facilities' mail streams is accumulated in the EDPAP by electronic communications forwarded by the presort facilities. Presort facilities typically operate on a "two pass" operational model where a first sort pass establishes records for the mail pieces in-house and the second sort pass organizes the mail into a commingled stream.

Because the presort facility is operating with a smaller body of mail than is encompassed by the nationwide system, commingling at this level may not be as efficient, or dense for any group of delivery points, as with the larger body of mail pieces. So during the first pass through the sorter, a record of the individual mail pieces identified can be forwarded by the presort facility to the PMM's EDPAP. The EDPAP contains programming logic to optimize the PMMFs' mail commingling by requesting physical mail be diverted and shipped from the presort facilities to the PMMFs for commingling. These decisions are based not only on the mail pieces themselves, but also on the geographic distribution of work so that the physical mail moves efficiently to the USPS Network Distribution Centers (NDCs) and Area Distribution Centers (ADCs) that will ultimately receive and deliver the mail.

Because cyclic work loads of the PMMFs and the presort facilities may show patterns over time, the EDPAP includes programming logic to predict the arrival of mail pieces at the various presort facilities and compare that to the expected arrival of the electronic images of mail pieces from its customers. Efficiencies can be increased over time as a statistical history is established.

The EDPAP functions by maintaining knowledge of the PMM's virtual mail images and requesting mail from presort facilities (or other large mailers) to be commingled with any of the PMMFs mail production. Further, the mail received from external sources may be included in StatementPacks.

Mail piece arrival notification messages are sent from the above-mentioned external facilities to the EDPAP at the PMM. The EDPAP determines in real-time if the mail piece should be diverted to a PMMF or processed normally by the external entity. The decision is based on virtual mail in production at a PMMF and the mail presorting or production in process at any or all external facilities. The weight, thickness and required delivery date of each piece may also be considered.

If the EDPAP determines that a mail piece should be included in a PMMF's production, it requests that the external entity divert the mail piece to that PMMF. It also flags the record of the mail piece in a persistent data store that the mail piece is expected. Physical mail pieces arriving at a PMMF from external entities are logged in Production and reconciled against the expected mail records.

The EDPAP may also use historical information for pre-notification of mail piece diversion at external facilities. The EDPAP is expected to log results over time and use this information to understand patterns in the cyclic work of the external entities and its own facilities. This allows the EDPAP to reduce its dependency on real-time messaging and reduce contention for real-time resources.

Automated Storage & Retrieval System (ASRS)—

The Automated Storage and Retrieval System (ASRS) is used to temporarily store physical mail trays that are either manufactured at the PMMF, directly by presort facilities, or the commingling sorters. Trays delivered to the mail cache may contain documents of known or unknown sequence.

One Address, Single Mailing Envelope (StatementPack®) Assembly—

A further level of optimization of the nationwide commingling infrastructure is the step of a final combination of mail pieces into a single mailing envelope mailed to one address (a single mailing envelope mailed to one address is termed a StatementPack® and is described in "System and Method for Combining Individual Statements into a Single Mailing Envelope" (U.S. Pat. No. 5,774,885, Delfer), which is herein incorporated by reference). This step combines multiple mail pieces going to a single address, delivery point, or individual recipient into a single package, leaving each individual mail piece unaltered. This step provides further efficiencies and cost savings based on USPS rules and discounts.

The Production process tracks the locations of every mail tray including those in the ASRS. It can on demand submit any individual tray to either the StatementPack® Assembler (SPK) for insertion into StatementPacks® or to the commingling sorter for further collation with other mail items before being submitted to the StatementPack® Assembler.

The StatementPack® Assembler draws its input from the output of the PMMF production line, or the ASRS, or commingling, or any combination of these three components.

PMMF Sort—

Once candidate StatementPacks® have been created, they may be again sorted in the commingling sorter to obtain further commingling density. This is an optional step, as determined by the EDPAP programming, which may include only a subset of the StatementPacks® output by these processes.

Production Feedback to the EDPAP—

The results of nationwide commingling and StatementPack® assembly may or may not match the original estimate based on changes in production schedules, remakes of damaged documents, or for other reasons. The final tallies of which individual mail pieces were commingled and/or mailed in a StatementPack® provide useful feedback to the EDPAP for future mail stream analysis.

The final result of these optimization steps is that the PMM, the presort facilities, and the USPS are all beneficiaries of the process.

As stated above, there are additional embodiments of the subject method and system than described here in detail and these are considered to be within the realm of this disclosure. One extension embodiment of the subject method and system is to extend the application to include not only presort facilities, but large mailers such as utilities, banks, etc. The subject method and system described above is intended to be illustrative of the central invention, but not by way of limitation to additional extensions or alternative means of processing. Another embodiment of the subject invention includes StatementPack® machines at the presort facilities or at distribution centers.

With particular attention to FIGS. 1A, 1B, 1C, and 1D (each one is a quadrant of the larger flow-diagram picture), the subject invention 5 is depicted. There are two general Legends 10 and 11 shown in FIG. 1: the first Legend 10 is drawn on the bottom of FIG. 1D and the second Legend 11 is drawn on the top of FIG. 1A. Described in first Legend 10 are various important features of the subject invention: 1) any pre-sort facility or other source of mail, including a print and mail manufacturing facility (PMMF) is given the identifier 13 and ranges in this embodiment example from PS1 to PS2 to PS3 to PS4 and may be less than four or greater than four, if desired; 2) the PMMF or alternative Distribution Center StatementPack® (SPK) Assembly is given the identifier 16 and ranges in this embodiment from PMMF/DC SPK1 to PMMF/DC SPK2 and may be one or greater than two, if desired; 3) the PMMF Commingling Operation (PMMF SORT) is given the identifier 19; 4) the physical mail pieces (MAIL) are given the identifier 22; 5) the PMMF location having virtual or physical work in process (WIP) is given the identifier 25 and in this embodiment has two exemplary locations "PMMF West WIP" and "PMMF East WIP" but may be in a single location or in more than two locations with the complete information held in the PMM Knowledge Virtual Mail-Physical Mail SPK Locations Database that is given the identifier 26; 6) the PMM Eligible Delivery Point Availability Predictor (EDPAP) is given the identifier 28; 7) the postal Area Distribution Center (ADC) is given the identifier 31; 8) the postal Network Distribution Center (NDC) is given the identifier 34; and 9) the Automated Storage and Retrieval System (ASRS) is given the identifier 37 and ranges from one to more than the two shown in this exemplary embodiment.

Described in second Legend 11 are further important features of the subject invention: 1) the Data flow for possible included mail is given the identifier 41, while the actual physical mail the system has for commingling-processing after a first pass sortation (Eligible Mail Request) is give the identifier 42 (the first pass sortation merely catalogues what mail the system actually/physically has available to process); 2) the Physical Mail SPK Location A is given the identifier 44; 3) the Physical Mail SPK Location B in given the identifier 47 and it is noted that the Physical Mail SPK Locations may be only one or greater than two; and 4) the flow of StatementPacks® is given the identifier 50.

First, it is pointed out that a general tenet of the subject invention is that any pre-sort facility or other entity that produces mail (banks, utilities, service providers, investment firms, and the like) diverts requested mail to the PMMF for sorting and blending/combining with other mail item sources that results in the cost-saving commingling of many types of mail items based on logical combinations facilitated by the EDPAP programming. Optionally, the use of single mailing envelopes or StatementPacks® that contain more than one mail item may be employed to add further savings to the subject commingling process.

Physical mail 22 is generated at several possible locations that include PS1, PS2, PS3, and PS4 pre-sort facilities 13 or other entities, noted above, that generate mail items. This first-run pre-sorted mail and the related data are collected by the PMMF 25 (physically located in West or East Coast regions or other geographical sites) which performs a second sort that permits commingling of mail items within the PMMF and the other presort facilities 13 according to the commingling rules within the EDPAP 28 (see immediately below and FIGS. 2A, 2B, and 2C). Physical mail 22 is temporarily stored within the ASRS 37 means until required for actual physical commingling. When StatementPacks® are utilized, the EDPAP 28 generates the SPK Optimization Data that is sent to the PMMF/DC SPK 1 or 2 locations to create the StatementPacks®. The generated StatementPacks® move to the PMMF Sort 19 and are forwarded to either the ADC 31 or NDC 34 postal distribution centers.

FIGS. 2A, 2B, and 2C show the EDPAP flow diagram that is an embodiment of the subject processing scheme that assists in implementing the subject invention. The flow scheme elements/steps in FIG. 2 clearly refer to the above-described subject invention and related within the overall subject system and method shown in FIG. 1. There are two interrelated subject processes shown in FIGS. 2A, 2B, and 2C. One process concerns the EDPAP and is depicted as a first dash-boxed region shown in FIGS. 2A and 2B, while FIG. 2C shows a second dash-boxed region for the production side of the subject process. As seen in FIG. 2A for the EDPAP side of the subject invention, eligibility processing starts 100 the subject process. The communications from the PS1 through PSn facilities are monitored 105. The question is asked concerning mail arrival messages 110 and if no, the process cycles back to monitoring 105, but if yes, the a receive mail arrival notification from each of the PS1 through PSn sites 115, 120, 125 is noted. At this point there is storage of information about eligible mail, mail addresses, and weight class information 130.

Also taking place while the above process is occurring is the receipt of virtual mail images 200 which is recorded as an inventory of virtual mail to be produced 205. A PMMF data base of WIP is created 210 including weight, thickness, and mail date.

The eligible mail process and the virtual mail process merge and at a comparison stage 135 of the system and eligibility for SPK combinations are determined 140 in consideration of what is occurring in the production facility (see below and in flow chart connection pathway BBB in FIGS. 2B and 2C). The question is posed as to whether or not eligible mail exists 145 and if not, the process recycles back to monitoring communications from the various PS sites 105. However, if yes, then the physical mail is diverted from PS1 through PSn 150, 155, and 160 and flagged as eligible mail that is requested 165.

On the production side of the process the physical mail is received 300 from the various PS1 through PSn sites 305, 310, and 315 and collated and recorded that the physical mail is received 320. There is a reconciliation 170 between physical mail received 320 versus physical mail requested 165 and the physical mail is cached in the ASRS 180. At this point, a match is made between the physical and virtual mail for SPK plans 175 and relayed to both the cached physical mail process in ASRS 180 and to creating SPKs for qualifying mail 420.

The actual mail production is started 400 with the production of physical mail from the inventory of virtual mail 405. The cached physical mail in ASRS 180 is utilized at step 410 to collate PS1 through PSn data and PMMF physical mail for feeds down on pathway to create SPKs from qualifying mail 420 or to a divert non-SPK mail pieces 415 pathway. The two pathways are utilized for the physical mail input to NDC or ADC 425.

From the description herein, it will be appreciated that the invention can be embodied in various ways, which include but are not limited to the following:

A mail item processing system for nationwide commingling of mail items to increase efficiency and lower mailing costs, comprising: a) at least one pre-sort facility or a plurality of pre-sort facilities, wherein the pre-sort facility or facilities create a first set of diverted mail items and a first set of associated data; b) a print and mail manufacture facility that generates a second set of manufactured mail items and a second set of associated data and receives said first set of diverted mail items and first set of associated data from the pre-sort facility or facilities; and c) computer facilitated and programmed controllers that direct physical mail sorting devices for commingling said first and second sets of mail items according to a predetermined set of commingling rules applied to said first and second sets of associated data to produce commingled mail items which reduced postal costs in mailing the commingled mail items.

A mail item system according to the previous embodiment, further comprising StatementPacks® assembly equipment for assembling a plurality of mail items going to one address within a single envelope.

A method for the nationwide commingling of mail items to increase efficiency and lower mailing costs, comprising the steps: a) diverting a first set of mail items at a pre-sort facility or plurality of pre-sort facilities that create a first set of mail items and a first set of associated data; b) generating a second set of manufactured mail items and a second set of associated data at a print and mail manufacture facility; c) receiving the first set of mail items and the first set of associated data from the pre-sort facility or facilities; and d) commingling the first set of diverted mail items with the second set of manufactured mail items according to a predetermined set of commingling rules applied to the first and second sets of associated data to produce reduced postal mailing costs in mailing the commingled mail items.

A method for the nationwide commingling of mail items according to any previous embodiment, further comprising the step of assembling a plurality of mail items going to one address within a single envelope.

Furthermore, embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation(s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A mail item processing system comprising:
   a first set of mail processing machines located at least one pre-sort facility at a first physical location, wherein the at least one pre-sort facility generates mail piece arrival notification messages that identify, in real-time, physical mail items present at the at least one pre-sort facility, wherein the first set of mail processing machines comprises:
   i) at least one first printer for printing mail pieces and envelopes,
   ii) at least one first collator for collating mail pieces in respective first groups of address-related mail pieces, and
   iii) at least one first diverter for diverting first groups of address-related mail pieces to be delivered to a respective print and mail manufacture facility; and
   a second set of mail processing machines located at the print and mail manufacture facility at a second physical location that differs from said first physical location, wherein the second set of mail processing machines comprises:
   i) at least one second printer for printing mail pieces and envelopes;
   ii) at least one second collator for collating mail pieces in respective groups of address-related mail pieces;
   iii) and at least one second inserter for inserting each respective group of address-related mail pieces into each single respective mailing envelope directed to a respective single mailing address to form each respective commingled mail item;
   wherein the second set of mail processing machines is configured to:
   i) receive the mail pieced arrival notification messages,
   ii) dynamically determine at least one commingling plan wherein the at least one commingling plan identifies at least one diverted physical mail item by a diverter, wherein the at least one diverted physical mail item is a mail item that is physically present at the at least one pre-sort facility and that should be physically commingled with at least one physically manufactured mail item of the print and mail manufacture facility;
   iii) dynamically generate, based on the at least one commingling plan, at least one diverted instruction to be electronically transmitted to the at least one pre-sort facility, wherein the at least one diverted instruction instructs the at least one pre-sort facility to physically divert the at least one diverted mail item to the print and mail manufacture facility;
   iv) dynamically generate the at least one manufactured physical mail item,
   v) receive the at least one diverted physical mail item from the at least one pre-sort facility;

vi) dynamically match the at least one diverted physical mail item to the at least one manufactured mail item based on the at least one commingling plan; and vii) dynamically commingle the at least one diverted mail item physically cached in an automated storage and retrieval system to the at least one manufactured physical mail item to produce at least one commingled physical mail item, thereby increasing efficiency for mailing multiple mail items and lowering overall mailing costs.

2. A method for mail item processing, comprising the steps:

generating, by a first set of mail processing machines located at least one pre-sort facility at a first physical location, mail piece arrival notification messages that identify, in real-time, mail items present at the at least one pre-sort facility at the first physical location, wherein the first set of mail processing machines comprises:
  i) at least one first printer for printing mail pieces and envelopes,
  ii) at least one first collator for collating mail pieces in respective first groups of address-related mail pieces, and
  iii) at least one first diverter for diverting first groups of address-related mail pieces to be delivered to a respective print and mail manufacture facility; and receiving, by a second set of mail processing machines located at a print and mail manufacture facility, at a second physical location that differs from said first physical location, the mail piece arrival notification messages;

wherein the second set of mail processing machines comprises:
  i) at least one second printer for printing mail pieces and envelopes;
  ii) at least one second collator for collating mail pieces in respective groups of address-related mail pieces;
  iii) and at least one second inserter for inserting each respective group of address-related mail pieces into each single respective mailing envelope directed to a respective single mailing address to form each respective commingled mail item;

dynamically determining, by the second set of mail processing machines, at least one commingling plan wherein the at least one commingling plan identifies at least one diverted physical mail item, wherein the at least one diverted physical mail item is a mail item that is physically present at the at least one pre-sort facility and that should be commingled by the at least one second collator with at least one manufactured mail item of the print and mail manufacture facility;

dynamically generating, by the second set of mail processing machines, based on the at least one commingling plan, at least one diverted instruction to be electronically transmitted to the at least one pre-sort facility, wherein the at least one diverted instruction instructs the at least one pre-sort facility to physically divert the at least one diverted physical mail item to the print and mail manufacture facility;

dynamically generating, by the second set of mail processing machines, the at least one manufactured mail item;

receiving, by the second set of mail processing machines, the at least one diverted physical mail item from the at least one pre-sort facility;

dynamically matching, by the second set of mail processing machines, the at least one diverted physical mail item to the at least one manufactured physical mail item based on the at least one commingling plan; and dynamically commingling, by the second set of mail processing machines, the at least one diverted mail item to the at least one manufactured mail item to produce at least one commingled physical mail item, thereby increasing efficiency for mailing multiple mail items and lowering overall mailing costs.

3. The method for mail item processing according to claim 2, further comprising the step of physically assembling, by the second set of mail processing machines, a plurality of mail items going to one address within a single envelope.

* * * * *